W. C. REUTTER.
AUTOMOBILE FENDER.
APPLICATION FILED MAR. 3, 1917.

1,223,904.

Patented Apr. 24, 1917.

Witness
H. W. Burton

Inventor
William C. Reutter
By W. W. Williamson
Attorneys

UNITED STATES PATENT OFFICE.

WILLIAM C. REUTTER, OF MANAYUNK, PENNSYLVANIA.

AUTOMOBILE-FENDER.

1,223,904.   Specification of Letters Patent.   Patented Apr. 24, 1917.

Application filed March 3, 1917. Serial No. 152,166.

*To all whom it may concern:*

Be it known that I, WILLIAM C. REUTTER, a citizen of the United States, residing at Manayunk, in the county of Philadelphia and State of Pennsylvania, have invented new and useful Improvements in Automobile-Fenders, of which the following is a specification.

My invention relates to new and useful improvements in automobile fenders, and has for its object to provide an exceedingly simple and effective device of this character which may be supported upon the frame of the automobile, and more particularly that portion of the frame that projects beyond the front of the automobile body, and to which is secured the front springs, said fender comprising a guard portion and a scoop portion, said scoop portion being pivoted to the frame of the guard portion to permit vertical movement of the front edge of said scoop portion, said scoop portion being normally held in a horizontal position, but capable of depression when contacting with a person, animal or object upon the road way.

A further object of the invention is to provide a fender comprising a guard consisting of a frame covered with a webbing or network of wire, rope or other suitable material and a scoop portion consisting of a frame covered with a webbing or network of wire, rope or other suitable material and pivoted to the lower edge of the guard portion, said scoop portion having rods pivoted at the ends thereof, which are slidably mounted in suitable sockets carried by the frame of the guard portion, said rods having springs connected thereto for normally holding the scoop portion of the fender in a horizontal position.

With these ends in view, my invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1:
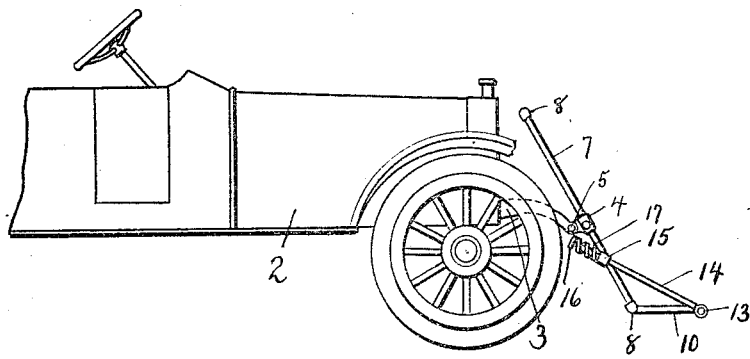
Figure 2:
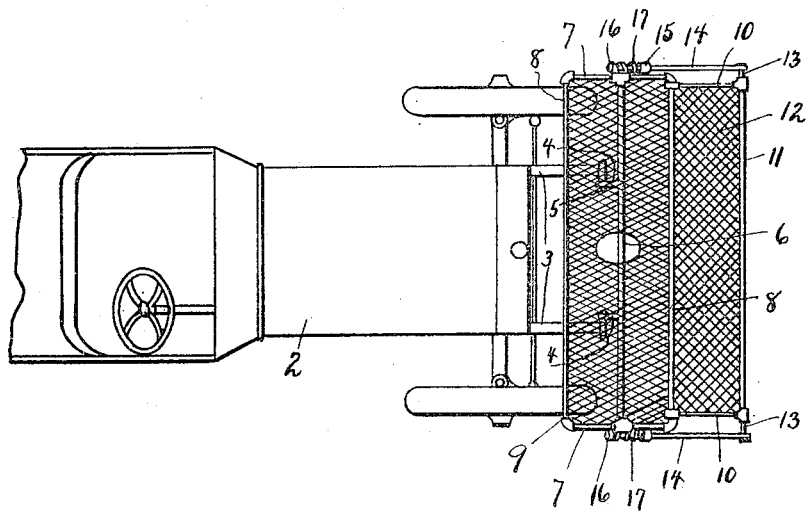

Figure 1, is a side elevation of a portion of an automobile showing my improved fender applied thereto; and Fig. 2, is a plan view thereof.

In carrying out my invention as here embodied 2 represents a vehicle here represented as an automobile, having the front portion of the frame 3 projected some distance beyond the axle and body thereof, said projected parts acting as supports for the fender. To the projected ends of the frame are fastened the ears 4 by means of the shackle bolts 5 used for fastening the usual springs to the frame, and these ears are carried by a cross bar 6 secured to the side bars 7 said side bars having upper and lower end bars 8 fastened thereto, all of said bars making up the frame of the guard portion of the fender. This frame is covered by a suitable webbing 9 of wire, rope or other suitable material. To the lower end bar of the guard portion are pivoted or hinged in any suitable manner the scoop side bars 10, to the outer or front ends of which are secured the ends of the front or contact bar 11, said front and side bars in conjunction with the lower end bar of the guard making up the scoop frame which is covered by a webbing 12 of rope, wire or other suitable material.

The scoop frame is provided at the front end at each side thereof with a pivot pin 13 and on these pivot pins are journaled the supporting rods 14 projecting rearwardly and upwardly through sockets 15 carried by the side bars of the guard frame. These supporting rods are slidably mounted in the sockets 15 and their inner and upper ends are provided with enlargements or caps 16 against which, as the movable members, rests one end of the helical springs 17 coiled about the rods 14, the other ends of said springs resting against the sockets 15 as the stationary members, the action of said springs normally holding the scoop portion of the fender in a horizontal position as plainly shown in Fig. 1.

When the automobile or vehicle to which the fender is attached is running under ordinary conditions the fender will be in a position shown in the drawings, but should the fender come in contact with a person or object, the scoop portion of the fender will be forced downward or depressed against the action of the spring 17, thus preventing said person or object from coming in contact with the vehicle or being run over thereby, but as soon as the person or object is removed from the fender, the scoop portion thereof will be automatically returned to its normal position by the action of the springs 17 as will be readily understood.

Of course I do not wish to be limited to the exact details of construction as here shown, as these may be varied within the limits of the appended claims without departing from the spirit of my invention.

Having thus fully described my invention, what I claim as new and useful, is—

1. In combination with a vehicle a fender embracing a guard, rigidly secured to said vehicle, a scoop hinged to the lower and forward end of said guard, sockets carried by the guard and supporting rods pivoted to the scoop and slidably mounted in said sockets.

2. In combination with a vehicle a fender embracing a guard rigidly secured to said vehicle, a scoop hinged to the lower and forward end of said guard, sockets carried by the guard, supporting rods pivoted at the front ends of the sides of the scoop and slidably mounted in said sockets, and means acting upon said rods for supporting the scoop in a normal horizontal position.

3. In combination with a vehicle a fender embracing a guard rigidly secured to said vehicle, a scoop hinged to the lower and forward end of said guard, sockets carried by the guard, supporting rods pivoted at the front ends of the sides of the scoop and slidably mounted in said sockets, spring engaging means carried by the inner ends of the supporting rods and springs coiled about said rods and situated between said spring engaging means and the sockets, whereby said springs will normally hold the scoop in a horizontal position.

In testimony whereof, I have hereunto affixed my signature.

WILLIAM C. REUTTER.

Copies of this patent may be obtained for five cents each, by addressing the "Commissioner of Patents, Washington, D. C."